No. 869,193. PATENTED OCT. 22, 1907.
H. F. NICHOLS.
FLEXIBLE WHEEL FOR MOTOR AND OTHER VEHICLES.
APPLICATION FILED APR. 20, 1906.

WITNESSES:
W. M. Avery
A. H. Davis

INVENTOR
Henry Francis Nichols
BY
Munn & Co
ATTORNEYS

UNITED STATES PATENT OFFICE.

HENRY FRANCIS NICHOLS, OF ADELAIDE, SOUTH AUSTRALIA, AUSTRALIA.

FLEXIBLE WHEEL FOR MOTOR AND OTHER VEHICLES.

No. 869,193.  Specification of Letters Patent.  Patented Oct. 22, 1907.

Application filed April 20, 1906. Serial No. 312,803.

*To all whom it may concern:*

Be it known that I, HENRY FRANCIS NICHOLS, engineer, a subject of the King of Great Britain and Ireland, residing at Grenfell street, Adelaide, State of South Australia, Commonwealth of Australia, have invented a certain new and useful Improved Flexible Wheel for Motor and other Vehicles, of which the following is a specification.

The object of this invention is to provide a resilient wheel for motors and other vehicles, which shall have the advantages of the pneumatic tire without its disadvantages such as the liability to puncture.

The invention relates to wheels of the kind constructed with an outer flexible rim or tire and an inner rigid rim with a series of springs arranged between and connecting them.

The outer flexible rim or tire is constructed of a number of blocks, plates or sections of metal, having inwardly and outwardly projecting sides, hinged or otherwise jointed together to form a flexible band or chain. The inner rigid rim is constructed preferably of a thin metal rim immediately surrounding a wooden rim. The inner rim is connected to the hub by spokes in the usual way. Between the outer flexible rim and the inner rigid rim are a number of plate springs set tangentially and connecting the two together, the springs corresponding in number to the number of blocks, plates or sections. The springs are detachably fastened at one end to the inner rim and towards the other end to the sections. Upon each side of the inner rigid rim is a detachable flange or check plate projecting from the rim to slightly beyond the inner edge of the outer rim, inclosing the springs and serving as a lateral support thereto and to the outer flexible rim. The springs and the outer flexible rim or tire occupy the space between the flanges and slide or undulate therein.

In order that my invention may be clearly understood I will describe the same with reference to the accompanying drawings in which—

Figure 1:
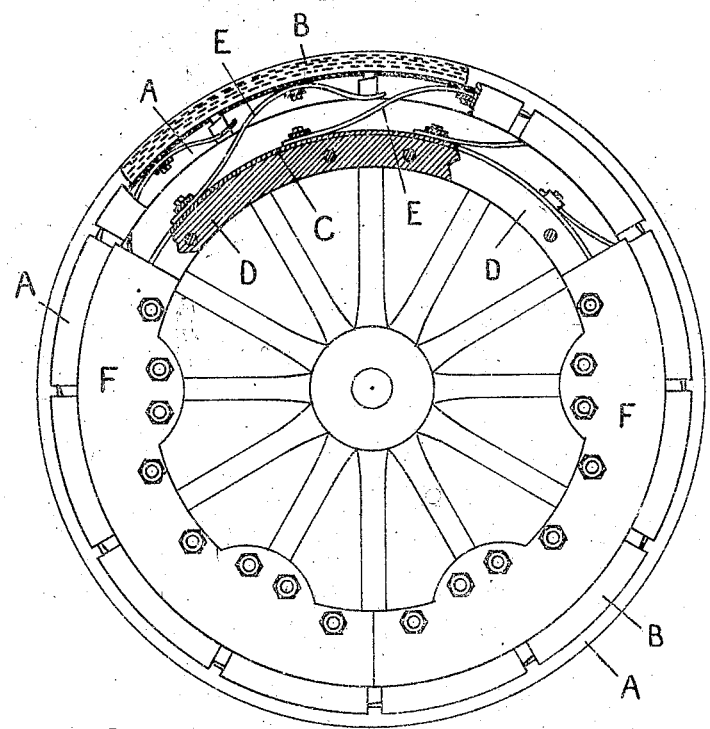
Figure 2:
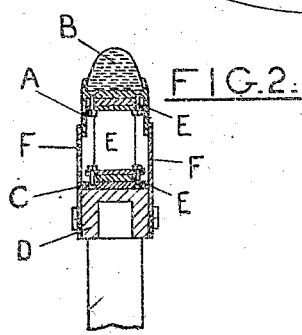
Figure 3:
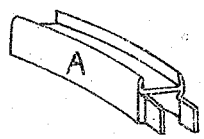

Figure 1 is a side view of my improved wheel with one of the check plates removed and showing portions of the rims in section. Fig. 2 is a cross section of portion of the rim. Fig. 3 is a perspective view of one of the outer rim sections. Figs. 2 and 3 are drawn to a larger scale than Fig. 1.

In the drawings. A A are a series of metal blocks or sections, forming with an encircling band B of flexible material such as rubber, the outer flexible rim or tire according to my invention.

C is a metal band immediately surrounding a wooden rim D, forming the inner rigid rim.

E E are a series of springs arranged between the inner and the outer rims. Each spring is attached at one end to the inner rim and towards the other end it is attached to one of the sections A of the outer rim, its unattached end however projecting towards the adjacent spring, so that upon the spring being much deflected the end impinges upon the adjacent spring and so is supported at both ends. The method of attachment I prefer is shown in Fig. 2, and consists of a clamping plate across the spring, bolted in one case to the metal rim and in the other case to the section.

F F are flange or check plates secured upon each side of the rigid rim. The flange on each side may be undivided but it is preferably made in three parts for convenience of removal and attachment. In order to allow for deflection or relative movement while preventing the entrance of dirt to the spring chamber, the ends of the sections A are of the form shown in Fig. 3. The sides at one end are extended forward but cranked or bent inwards, so that the extended sides of the one section fit between the sides of the adjacent section.

Having now fully described and ascertained my said invention and the manner in which it is to be performed I declare that what I claim is—

1. In a flexible wheel for motor and other vehicles, an outer flexible rim or tire comprising a number of blocks or sections and an encircling band of flexible material such as rubber, an inner rigid rim connected to the hub by spokes, a series of plate springs corresponding in number to the sections of the outer rim and set tangentially to the rim, one end of each spring being secured to the inner rim and the other end free, the central portion being secured to the middle of a section, and detachable flanges or check plates secured to the inner rim and overlapping a portion of the outer flexible rim, all substantially as described and for the purpose set forth.

2. In a wheel of the character described, an outer rim comprising a number of blocks or sections having inwardly and outwardly projecting sides, the inwardly projecting sides at one end being extended and cranked or bent inward so that they fit between the sides of the adjacent section.

3. In a wheel of the character described, an outer rim comprising a plurality of sections, an inner rim, and a plurality of plate springs between the rims and set tangentially thereto, one end of each spring being secured to the inner rim and the other end free to impinge upon the top of the next succeeding spring, the central portion of the spring being secured to the adjacent section of the outer rim.

4. In a wheel of the character described, a rigid inner rim, a flexible outer rim, and a plurality of plate springs arranged between the rims, the springs each being secured at one end to the inner rim and intermediate of its ends to the outer rim, the free ends of the springs being adapted to impinge upon the adjacent spring.

In testimony that I claim the foregoing as my invention I have signed my name in the presence of two subscribing witness this fifteenth day of March 1906.

HENRY FRANCIS NICHOLS.

Witnesses:
ARTHUR GORE COLLISON,
LESLIE HERBERT BROADBENT.